Figure 1:
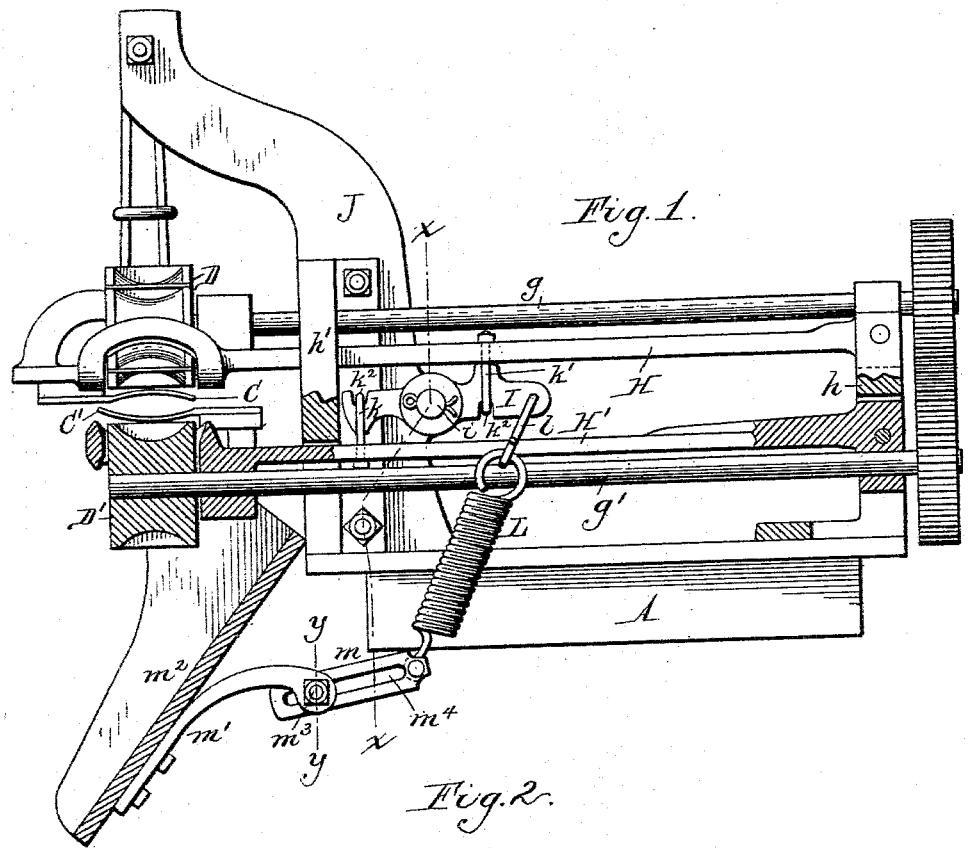

(No Model.) 2 Sheets—Sheet 1.

W. SPRAGUE.
MACHINE FOR CUTTING GREEN CORN FROM THE COB.

No. 494,799. Patented Apr. 4, 1893.

Witnesses:
Emil Neuhart
Theo. L. Popp

Welcome Sprague Inventor.
By Wilhelm Bonner
Attorneys.

(No Model.) 2 Sheets—Sheet 2.
W. SPRAGUE.
MACHINE FOR CUTTING GREEN CORN FROM THE COB.
No. 494,799. Patented Apr. 4, 1893.
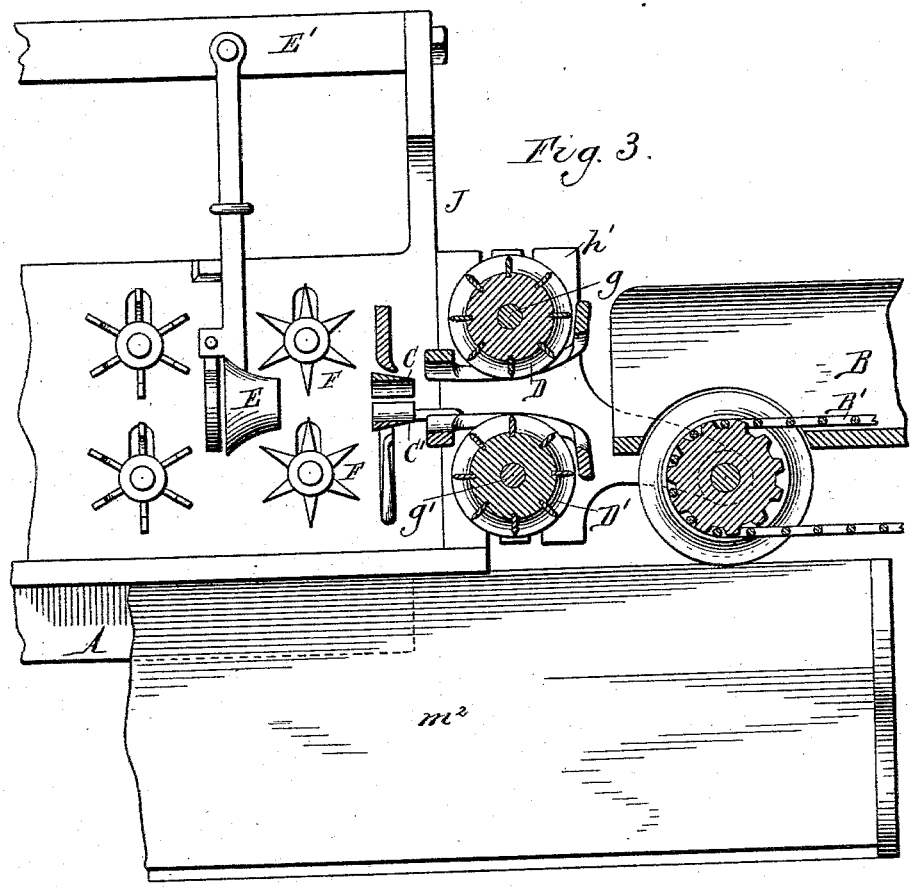
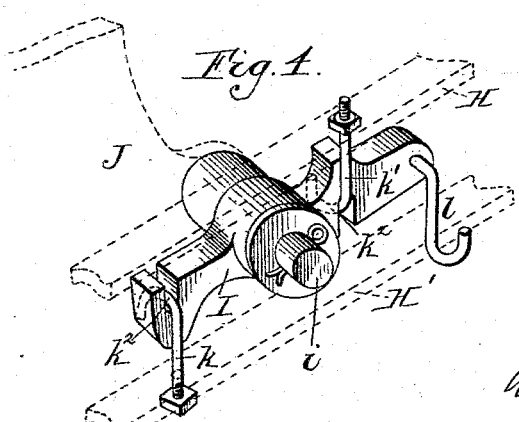
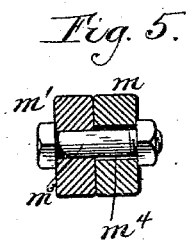

UNITED STATES PATENT OFFICE.

WELCOME SPRAGUE, OF FARNHAM, NEW YORK, ASSIGNOR TO THE SPRAGUE MANUFACTURING COMPANY, OF SAME PLACE.

MACHINE FOR CUTTING GREEN CORN FROM THE COB.

SPECIFICATION forming part of Letters Patent No. 494,799, dated April 4, 1893.

Application filed January 17, 1893. Serial No. 458,634. (No model.)

*To all whom it may concern:*

Be it known that I, WELCOME SPRAGUE, a citizen of the United States, residing at Farnham, in the county of Erie and State of New York, have invented a new and useful Improvement in Machines for Cutting Green Corn from the Cob, of which the following is a specification.

This invention relates to that class of green corn cutting machines which are provided with self-adjusting cutters between which the ear of corn is fed, and feed devices whereby the ear is moved through the cutters, and more particularly to an improvement in a machine of this kind, for which Letters Patent of the United States No. 422,650 were granted to me March 4, 1890. In the machine of this patent, the ear of corn is fed by a pair of feed wheels to a set of horizontal cutters which remove the kernels on the upper and lower portions of the ear, and thence to a set of vertical cutters which remove the remaining kernels on the side portions of the ear. The first set of cutters and the feed wheels whereby the ear is fed thereto are mounted upon yielding arms which permit the feed wheels and cutters to adjust themselves to the size of the ear. The second set of vertical cutters is supported from a stationary part of the machine. As the ears are supported upon the lower feed roller in passing to the first set of cutters, this roller tends to sag under the weight of the ears, and the cutters of the first set, being mounted upon the pivoted supporting arms with the feed rollers, take part in the movements of the latter, so that the alignment of the ear with reference to the first set of cutters is practically undisturbed and the kernels on the upper and lower sides of the ear are evenly cut off; but as the second set of cutters do not partake of the vertical movement of the feed rollers, the cutting axis of the first set of cutters stands slightly below that of the second set, so that the ear upon issuing from the first set of cutters is presented to the second set slightly out of center, which results in cutting off only the kernals on the lower side portions of the ear, leaving those on its upper side portions untouched or only partially cut off.

The object of my invention is to center the ear between the cutters in a reliable manner, so that the kernels on all parts of the ear are cut clean from the cob.

Figure 2:
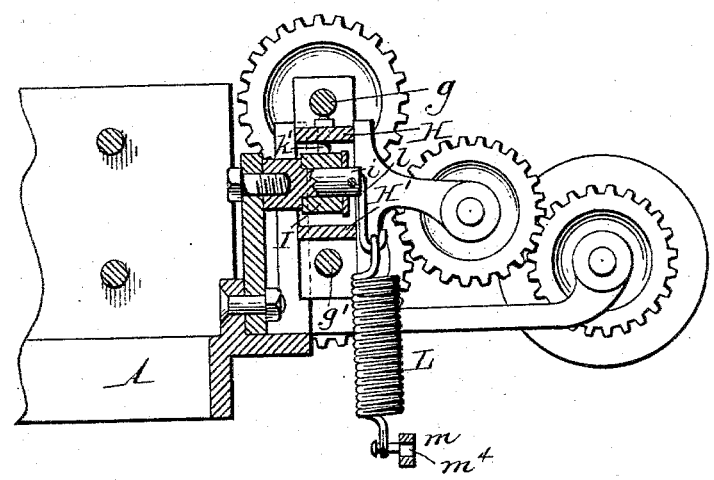

In the accompanying drawings consisting of two sheets—Figure 1 is a sectional front elevation of my improved machine. Fig. 2 is a fragmentary vertical longitudinal section thereof in line $x-x$, Fig. 1. Fig. 3 is a fragmentary side elevation of the machine, partly in section. Fig. 4 is a detached perspective view of the equalizing lever and connecting parts, on an enlarged scale. Fig. 5 is a cross section in line $y-y$, Fig. 1, on an enlarged scale.

Like letters of reference refer to like parts in the several figures.

A represents the bed of the machine which may be supported upon legs or any other suitable base frame.

B is the horizontal feed trough in which the corn is placed, and B' the traveling feed belt arranged with its upper side in the bottom of the trough.

C C' represent the first set of self adjusting cutters which are arranged horizontally, and D D' are the feed wheels arranged between the discharge end of the feed belt and the first set of cutters.

E represents the second set of cutters which are arranged vertically and receive the ear from the first set, and F are the feed wheels arranged between the two sets of cutters. The cutters E are suspended from a stationary horizontal bar E' of the machine. The feed rollers D D' may be of any suitable construction and are secured to the outer ends of transverse horizontal shafts $g$ $g'$ which are supported near their ends in bearings formed in vertically swinging arms H H'. These arms are pivoted at their inner ends to the standard $h$, and are guided at their outer ends in upright slots formed in the standard $h'$. The primary cutters C C' are secured to the outer ends of the upper and lower supporting arms H H' respectively, so as to take part in the vertical movement of the feed wheels.

I is an equalizing lever arranged between the two supporting arms H H' and pivoted upon a horizontal bolt or arbor $i$ which is secured to a standard J mounted upon the bed of the machine. The outer arm of this lever is connected with the lower supporting arm H' by a link *k*, while its inner arm is connected with the upper supporting arm H by a similar link *k'*. Each of these links is provided at its outer end with a hook $k^2$ which embraces the adjacent arm of the lever and is confined in a notch formed in the arm.

L is a spiral spring connected at its upper end with the inner end of the equalizing lever by a hook or link *l*, and with its opposite end to a stationary part of the machine, so as to resist the swinging movement of the equalizing lever on its pivot and thereby oppose further separation of the pivoted supporting arms and the feed wheels and horizontal cutters mounted thereon. In the construction shown in the drawings, this resisting spring is attached at its lower end to a link *m* which is adjustably attached to a bracket *m'* secured to the rear side of the discharge apron or chute $m^2$ which receives the detached kernels of corn. The link *m* is secured to the bracket *m'* by a horizontal clamping bolt $m^3$ which passes through the bracket and a longitudinal slot $m^4$ formed in the link, as shown in Figs. 1 and 5, so that upon loosening this bolt, the link may be moved up or down as well as lengthwise on its supporting bracket, for regulating the tension of the spring. The spring tends to pull the inner arm of the lever downward and its outer arm upward, and as the supporting arms H H' are respectively connected with the arms of the lever, the supporting arms and the feed wheels and cutters mounted thereon are constantly drawn toward each other. As soon as an ear of corn enters between the cutters the feed wheels spread apart sufficiently to admit the ear between them, and this spreading movement of the two arms is equalized by the lever, so that any sagging of the lower feed roller is compensated by a corresponding elevation of the upper roller, thereby practically maintaining the cutting axes of the two sets of cutters in line and reliably centering the ear of corn between both sets of cutters, whereby the kernels are evenly and uniformly cut from all portions thereof.

As the upper supporting arm H is connected with the equalizing lever at a shorter distance from its pivot than the lower supporting arm, the link of the upper arm is located correspondingly nearer the fulcrum of the equalizing lever than the link of the lower supporting arm, so as to equalize the movement of the two supporting arms, and the cutters and feed wheels carried by the same. The shafts of the feed wheels C C' are driven at equal speeds by intermeshing gear wheels mounted on their shafts, and the other feed wheels F and the feed belt B' may be driven in any ordinary manner.

The driving mechanism forms no part of my present improvement, and is therefore not fully shown in the drawings.

I claim as my invention—

1. The combination with the bed or frame of the machine, a set of self adjusting feed wheels and a set of cutters, of relatively movable supports carrying the feed wheels, and an equalizing device whereby the movement of either support is imparted to the other support, substantially as set forth.

2. The combination with the bed or frame, a set of self-adjusting feed wheels and a set of cutters, of relatively movable supports carrying the feed wheels, and an equalizing lever connecting said supports, whereby the movement of either of the supports is transmitted to the other, substantially as set forth.

3. The combination with the bed or frame, and supporting arms attached to the bed and capable of moving toward and from each other a set of feed wheels and a set of primary cutters mounted upon said supporting arms, an equalizing device whereby the movement of either of said arms is imparted to the other arm, and a secondary set of cutters arranged beyond the first set and receiving the ear of corn from the latter, substantially as set forth.

4. The combination with the bed or frame of the machine, a set of feed wheels and a set of cutters, of relatively movable supporting arms guided on the bed or frame and carrying the feed wheels, an equalizing lever connecting said arms, and a spring which resists the spreading movement of the arms, substantially as set forth.

5. The combination with the bed or frame of the machine, a set of feed wheels and a set of cutters, of supporting arms pivoted to the bed or frame and carrying said feed wheels and cutters, an equalizing lever connecting said pivoted arms, and a spring connected with said lever and resisting the spreading movement of the pivoted arms, substantially as set forth.

6. The combination with the bed or frame of the machine, a set of feed wheels and a set of cutters, of arms pivoted to the bed or frame and supporting said feed wheels, an equalizing lever connecting said supporting arms, a resisting spring connected at one end to said lever, and an adjustable link connecting the opposite end of the spring with a stationary part of the machine, substantially as set forth.

7. The combination with the bed or frame of the machine, a set of feed wheels and a set of cutters, of vertically swinging supporting arms pivoted to the bed or frame and carrying the feed wheels and cutters, an equalizing lever pivoted between its ends to the bed or frame, links connecting said supporting arms with the respective arms of the lever and a resisting spring connected with one arm of said lever, substantially as set forth.

Witness my hand this 26th day of September, 1892.

WELCOME SPRAGUE.

Witnesses:
BENJ. F. GREENE,
WM. AHLERS.